United States Patent [19]

VanRemortel et al.

[11] 4,221,432
[45] Sep. 9, 1980

[54] RETRACTABLE WHEEL FLAPS FOR DUMP TRUCKS

[76] Inventors: Jack D. VanRemortel, 16031 Summit Dr., Eden Prairie, Minn. 55344; James D. Rohr, 5600 Glen Moor Circle, Hopkins, Minn. 55343

[21] Appl. No.: 893,083

[22] Filed: Apr. 3, 1978

[51] Int. Cl.² ............................................. B62D 25/16
[52] U.S. Cl. ............................ 298/1 SG; 280/154.5 R
[58] Field of Search ............... 298/1 SG; 280/154.5 R

[56] References Cited

U.S. PATENT DOCUMENTS

| 2,935,336 | 5/1960 | Case | 280/154.5 R |
| 4,097,090 | 6/1978 | Payne | 298/1 SG |

Primary Examiner—Stephen G. Kunin
Assistant Examiner—George F. Abraham
Attorney, Agent, or Firm—John W. Adams

[57] ABSTRACT

A retractable wheel flap-mounting assembly for dump trucks which includes a rigid supporting member fixed to the rear edge of the bottom of the dump truck body and having a pair of flap-mounting slides slidably mounted on said supporting member with means for moving the slides inwardly into retracted position when the dump body is to be dumped.

1 Claim, 3 Drawing Figures

RETRACTABLE WHEEL FLAPS FOR DUMP TRUCKS

BACKGROUND OF THE INVENTION

It has been a serious problem for truck operators to maintain the size (required by law) of the protective wheel flaps behind the truck wheels of dump trucks. The problem arises when the dump body is raised into dumping position thus projecting the wheel flaps (mounted at the rear end of the dump body) downwardly into engagement with the rear wheels of the truck, which causes damage to the flaps. When the wheel flaps come in contact with the wheels, they are frequently broken off or bent and as a result the truck operators, for the most part, drive without the required wheel flaps and subject themselves to the penalties prescribed by the law when caught. The present invention provides a solution to this problem by mounting the wheel flaps on slides so that they may be retracted inwardly and out of contact with the wheels so that they may be free to swing forwardly under the truck as the dump body is elevated into dumping position.

SUMMARY OF THE INVENTION

This invention constitutes a relatively simple yet effective solution to the problem of damaging or destroying wheel flaps when the truck dump body is dumped. This is accomplished by providing rigid mounting means fixed to the rear end of the dump body and provided with slide elements mounted thereon for supporting the respective flap units. Suitable means for retracting the slides and flaps assemblies inwardly toward the center of the truck may be provided, such as the air cylinder arrangement illustrated in the embodiment of the invention disclosed herein.

DETAILED DESCRIPTION OF THE PREFERRED EMBODIMENTS

Figure 1:
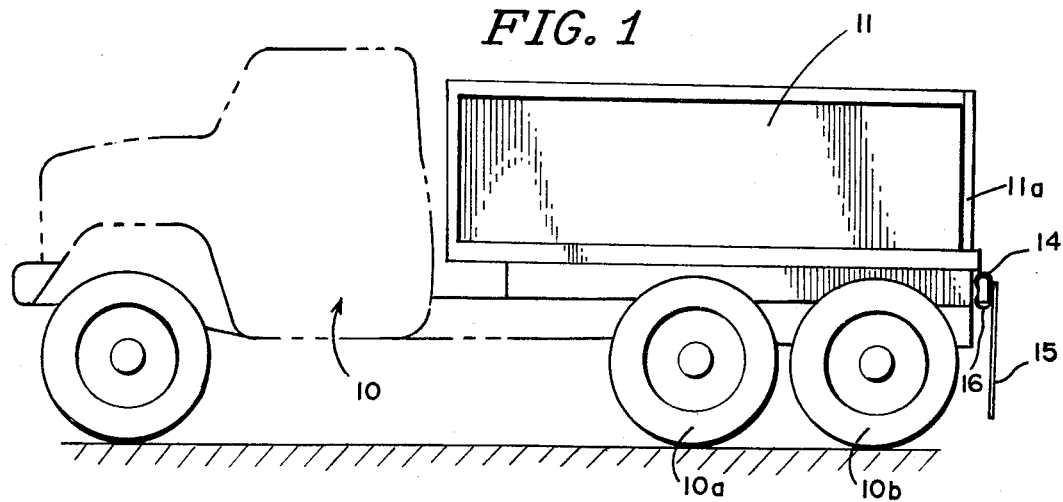
FIG. 1 is a side elevational view of a dump truck showing the retractable wheel flap embodying the invention.
Figure 2:
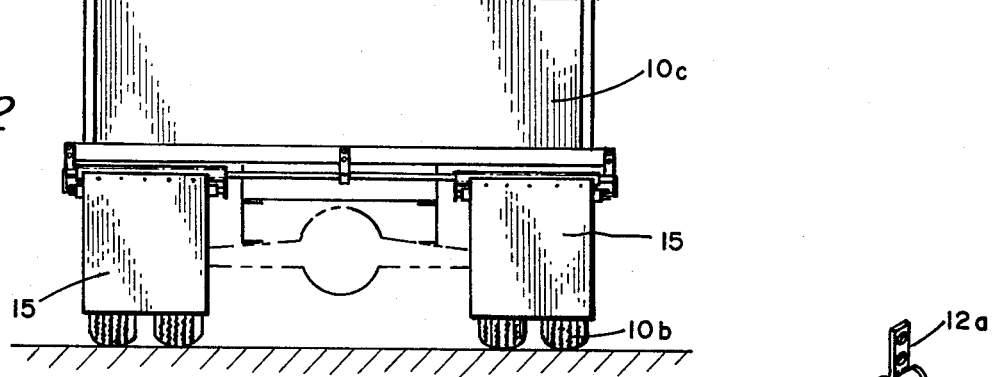
FIG. 2 is a rear elevational view thereof.
Figure 3:
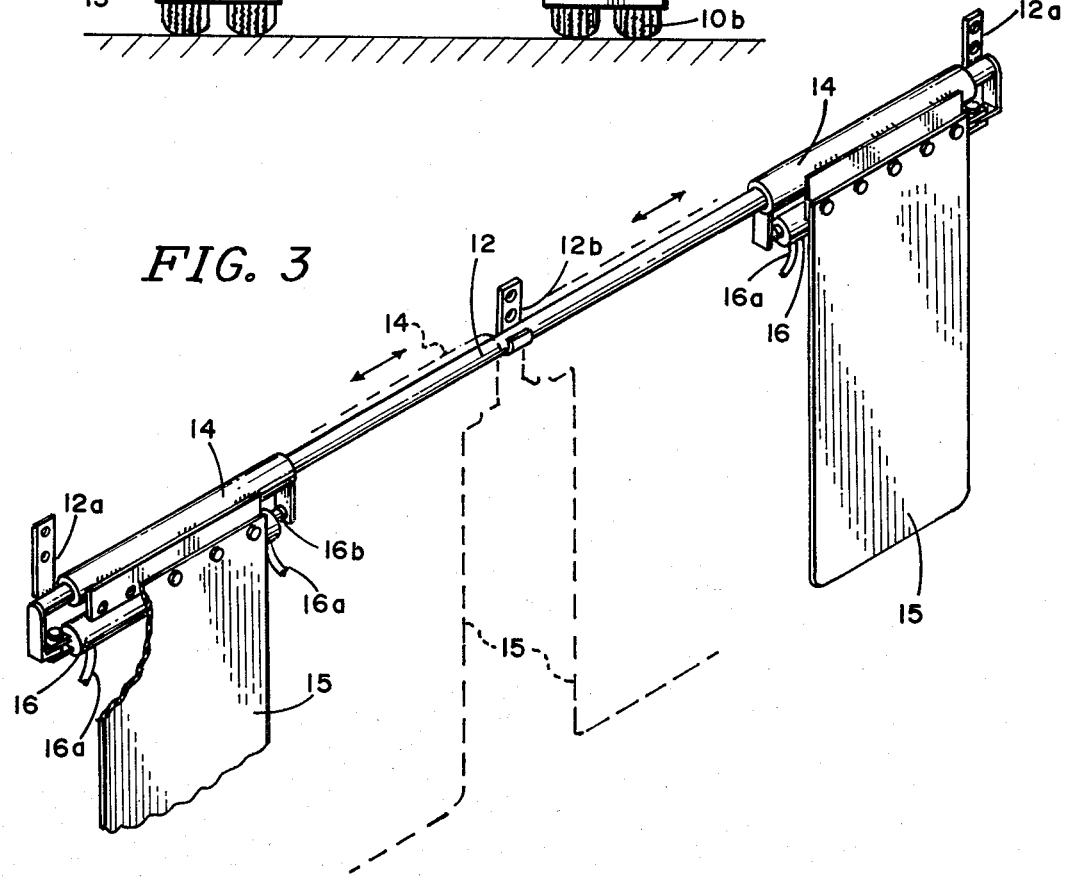
FIG. 3 is a perspective view of the flap mounting assembly, per se.

A truck 10 is illustrated in FIGS. 1 and 2 and has a tandem rear wheel arrangement embodying wheels 10a and 10b. The dump body 11 of the truck includes a tailgate portion 11a. In the form shown, an elongated rigid support member 12 is fixed to the rear dump body below the tailgate 10c, as best shown in FIG. 1. The support member 12 is secured to the dump body by means of suitable bracket elements 12a at the outer ends thereof and a center bracket 12b. A pair of slides 14 are respectively mounted for sliding movement on the elongated support member 12, as best shown in FIG. 3. Protective wheel flaps 15 are mounted in depending relation on the slides 14, as best shown in FIG. 3, and move therewith on the support member 12. Suitable means for shifting the slides 14 are provided, such as the double acting air cylinders 16 which are of conventional design and have conventional control valve construction (not shown).

When the truck body 11 is to be dumped, pressurized air (as from the air brake system of the truck) is directed into the outer ends of the cylinders 16 through the air hoses 16a and this projects the extensible rod 16b inwardly from the inner ends of the cylinders 16. The rod 16b is connected with the respective sleeve of slide member 14 and the slide and flap assembly is retracted inwardly toward the center line of the truck body 11, as shown by the dotted position in FIGS. 2 and 3. With the wheel flaps retracted inwardly as described above, the truck body may be dumped and the wheel flaps 15 will merely swing inwardly into the area between the rear wheels 10b and will pass between the wheels so that the flaps 15 will not engage the wheels and therefore will not be damaged during the dumping operation.

It will be seen that this invention provides a relatively simple, yet effective solution to the problem of damaging the protective wheel flaps whenever the dump body is dumped, as has been the case in the past. This is a particularly serious problem with tandem drive trucks where the rear wheels are disposed in very close relationship to the rear end of the dump body.

It will, of course, be understood that various changes may be made in the form, details, arrangement and proportions of the parts without departing from the scope of this invention which is defined by the appended claims.

What is claimed is:

1. Retractable wheel flaps for a dump truck of the type having a pair of rear wheels and a dump body and comprising:

elongated support means mounted in fixed transverse relation on the dump body under the tailgate of the dump truck in close association behind the rear wheels, a pair of flap-mounting slides slidably mounted on said elongated support means for movement inwardly and outwardly thereon transversely of the dump body, a pair of flaps respectively fixedly mounted on said slides and normally extending downwardly behind the wheels in close association therebehind, a pair of double acting reciprocating fluid operated cylinders including a projectable element connected to said slides for moving said slides with the flaps attached thereto inwardly into retracted position to permit the dump body to be swung into dumping position without engaging the flaps with the wheels of the dump truck and for moving the slides outwardly into operative position on said support means and control means for actuating said cylinders to shift said flaps from one position to the other.

* * * * *